US009742287B2

(12) United States Patent
Rieux-Lopez et al.

(10) Patent No.: US 9,742,287 B2
(45) Date of Patent: Aug. 22, 2017

(54) SWITCHED-MODE POWER SUPPLY COMPRISING A MODULE FOR CHARGING AND DISCHARGING AN ENERGY STORE INCLUDING AN ELECTRICAL TRANSFORMER

(71) Applicant: Airbus Operations (S.A.S.), Toulouse (FR)

(72) Inventors: Olivier Rieux-Lopez, Lisle sur Tarn (FR); Arnaud Davy, Pechbonnieu (FR); Thibault Pinchon, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 14/470,449

(22) Filed: Aug. 27, 2014

(65) Prior Publication Data

US 2015/0062976 A1  Mar. 5, 2015

(30) Foreign Application Priority Data

Aug. 27, 2013  (FR) ..................... 13 58197

(51) Int. Cl.
| H01H 47/00 | (2006.01) |
| H02M 3/335 | (2006.01) |
| H02J 9/06  | (2006.01) |
| H02M 1/00  | (2006.01) |

(52) U.S. Cl.
CPC ... H02M 3/33507 (2013.01); H02M 3/33584 (2013.01); H02J 9/061 (2013.01); H02M 2001/0096 (2013.01)

(58) Field of Classification Search
CPC ......... H02M 3/33507; H02M 3/33584; H02M 2001/0096; H02M 7/51; H02J 9/061

USPC .................. 363/21.04, 21.12, 116, 121, 167; 320/140, 141, 142, 145, 166; 307/109, 307/110; 361/155, 156, 212
See application file for complete search history.

(56) References Cited

U.S. PATENT DOCUMENTS

| 5,956,241 A * | 9/1999 | LoCascio .............. H02J 7/0024 363/131 |
| 6,057,609 A * | 5/2000 | Nagai ..................... H02J 9/061 307/66 |
| 8,536,824 B2 * | 9/2013 | St-Jacques ............ H02J 7/0016 320/103 |
| 9,112,369 B2 | 8/2015 | Rieux-Lopez et al. |
| 2007/0041222 A1 | 2/2007 | Eguchi et al. |
| 2009/0237030 A1 * | 9/2009 | Oh ........................ H02J 7/0016 320/108 |
| 2009/0290387 A1 | 11/2009 | Wheler et al. |

(Continued)

FOREIGN PATENT DOCUMENTS

FR       2 983 005 A1    5/2013

OTHER PUBLICATIONS

French Search Report for Application No. 135819 dated Apr. 17, 2014.

(Continued)

*Primary Examiner* — Alex Torres-Rivera
(74) *Attorney, Agent, or Firm* — Jenkins, Wilson, Taylor & Hunt, P.A.

(57) ABSTRACT

The disclosure concerns a switched-mode power supply comprising a module for charging and discharging an energy store including an electrical transformer. The device provides high configuration flexibility.

11 Claims, 5 Drawing Sheets

(56) References Cited

U.S. PATENT DOCUMENTS

| | | | | |
|---|---|---|---|---|
| 2011/0248677 A1* | 10/2011 | Shimizu | ............... | H02J 7/0016 |
| | | | | 320/118 |
| 2011/0255314 A1* | 10/2011 | Kuebrich | ............ | H02M 1/4208 |
| | | | | 363/46 |
| 2013/0027981 A1 | 1/2013 | Liu et al. | | |
| 2014/0021790 A1* | 1/2014 | Wang | ...................... | H02J 9/062 |
| | | | | 307/66 |

OTHER PUBLICATIONS

Giridharan, S. "A Novel Transformer-less Uninterruptible Power Supply", Sep. 30, 1996, XP055114396, http://www.peg.ee.iisc.ernet.in/people/faculty/vram/smpc/pdf/giridharan.pdf.

* cited by examiner

-- PRIOR ART --

$X_{ch}$: store charging signal $X_{dch}$: store discharging signal

SWITCHED-MODE POWER SUPPLY COMPRISING A MODULE FOR CHARGING AND DISCHARGING AN ENERGY STORE INCLUDING AN ELECTRICAL TRANSFORMER

TECHNICAL FIELD

The present disclosure relates to switched-mode power supplies. More particularly, the present disclosure concerns the protection of switched-mode power supplies against voltage micro-outages at the input to such supplies.

BACKGROUND

Generally, a switched-mode power supply receives a DC voltage as input, coming from a DC network. It is also possible to configure the switched-mode power supply to be supplied by a DC voltage resulting from rectification of an AC voltage. A supply may be subjected to a micro-outage when it is deprived of an energy source for a short time. In order to protect the supply from micro-outages and to enable it to continue to operate (that is to say to continue to supply its output voltage or voltages) during the network micro-outage, protection architectures may be implemented.

Document FR 2 983 005 discloses a switched-mode power supply architecture as represented by the circuit of FIG. 1.

Input terminals 100, 101 receive a DC input voltage to convert from a DC electrical network (or from a rectified AC network). A conversion module 102 (which may comprise a plurality of converters) regulates that input DC voltage and provides regulated output voltages on the output terminals 103. In order to protect the switched-mode power supply, an energy store module 104 is connected to the terminals of the conversion module.

A control circuit 105 (for example a NOT gate) controls a switch 106 (for example a MOSFET transistor) connected in parallel with a diode 107. All the components 105, 106 and 107 form part of a module 108 for connecting and disconnecting the supply of the electrical network providing the DC voltage input.

The storage module is charged and discharged by a charging and discharging module 109. The module 109 comprises a circuit of "buck-boost" type (a circuit of "inverter" type).

Two switching modules 110, 111 are connected in parallel to the energy store module. Each switching module comprises a switch (for example a MOSFET transistor) connected in parallel with a diode. The switches are controlled by a charging and discharging management module 112.

The module 111 is connected between the storage module 104 and the module 110. The module 110 is connected between the module 111 and the conversion module 102.

An inductor 113 is connected between the input terminal 101 and the connection point of the switching modules 110 and 111.

The voltage of the input terminal 101, which is common to the input electrical network, to the charging and discharging module 109 and to the energy store module 104 is taken as a reference. This node of the circuit is taken as the ground (or "cold point") for the circuit. The cold point of an electrical supply corresponds to its negative terminal or to the ground of the circuit of which it forms part. In contrast, the "hot point" of the supply corresponds to its positive terminal.

When a micro-outage occurs, an architecture according to document FR 2 983 005 makes it possible to have, at the input of the conversion module, a regulated DC voltage while the energy store stored in the storage module is used, independently of the voltage at the terminals of the storage module.

Furthermore, the conversion module is always connected (via the charging and discharging module) to the energy store. The conversion module is thus not disturbed at the start of the micro-outage, when it stops using the energy of the network to begin to use that of the storage module. The same applies at the end of the micro-outage.

Furthermore, the charging and discharging module only generates significant losses during the period of the initial charging of the storage module and during the micro-outage.

The architecture according to document FR 2 983 005 thus provides numerous advantages relative to the architectures of the prior art constituted by series and parallel structures presented in that same document.

The architecture disclosed herein has been developed by making improvements thereto, in particular by providing high freedom of implementation.

SUMMARY

A first aspect of the disclosure concerns a switched-mode electrical power supply for regulating a DC input voltage provided between two input terminals of the device by an electrical network, the device comprising:
- at least one conversion module to convert the DC input voltage into a regulated DC voltage,
- an energy store module to store electrical energy to yield to the conversion module in case of outage of the DC input voltage, and
- a management module to manage the charging and discharging of the store module.

The device further comprises an electrical transformer, wherein:
- a primary circuit connected between the input terminals comprises a primary winding of the transformer connected in series with a first switching module controlled by the management module, and
- a closed secondary circuit comprises a secondary winding connected in series with the energy store module and a second switching module controlled by the management module.

A device according to the first aspect may be used in a large number of configurations. It thus provides the possibility of adapting it to diverse situations which may be encountered in the supply systems in which such a device is designed to be integrated.

Furthermore, a device according to the first aspect makes it possible to use a store voltage (at the terminals of the energy storage module) and a bus voltage (at the conversion module input) that are very different (the bus voltage may for example be 5V and the store voltage 100V).

Thus, the integration of a device according to the first aspect is facilitated, even in systems in which the network voltage is very much lower than the store voltage. A device according to the first aspect mitigates the constraint of keeping these voltages close.

It is thus possible to choose the technology for the energy storage module, independently of the supply network characteristics, in particular, the bus voltage.

The ratio of the number of turns of the two windings of the transformer provides a degree of additional freedom for optimizing the charging and discharging module as well as the storage module.

A device according to the first aspect enables regulation of the charging and discharging module of the storage module in current mode. The measurements of current are facilitated by the use of the transformer.

In an architecture of a device according to the first aspect, the control of the switching modules is facilitated. These switching modules may be referenced with opportune voltages.

It is not necessary to manage negative voltages. It is for example possible to perform measurements of current easily with two shunts referenced to ground, in series with the switching modules (for example with the sources of transistors of these modules). It is thus possible to positively measure the current in the operating phase in which that measurement is useful to determine the time at which the switching module is opened.

A device according to the first aspect may be seen from the outside in the same way as a device having "inverter" type topology. The changes in the bus and store voltages are the same and the current taken from the network is the same. Thus, it is possible to use a device according to the first aspect as a replacement for an "inverter" device in a transparent manner.

A device according to the first aspect may for example implement an "isolated inverter" or "flyback" topology.

For example, the secondary circuit is closed on itself.

The secondary circuit may be closed on one of the input terminals.

The device may furthermore comprise a disconnection module for disconnecting the device from the electrical network in case of outage of the DC input voltage.

For example, the disconnection module is connected to a different input terminal to that on which the secondary coil is closed.

As a further example, the disconnection module is connected to the cold point of the device.

The secondary circuit may be closed on an output terminal of the conversion module supplying the regulated DC voltage.

For example, at least one of the first and second switching modules has a connection terminal connected to the cold point of the device.

By way of further example, at least one of the first and second switching modules has a connection terminal connected to the hot point of the device.

According to some embodiments, the corresponding ends of the primary and secondary windings are connected to a voltage that is not subjected to switched mode.

A second aspect of the disclosure concerns an electrical supply system, in particular for an aircraft, comprising a device according to the first aspect.

BRIEF DESCRIPTION OF THE DRAWINGS

The features and advantages of the present subject matter will be more readily understood from the following detailed description which should be read in conjunction with the accompanying drawings that are given merely by way of explanatory and non-limiting example, and in which.

DETAILED DESCRIPTION

Figure 1:
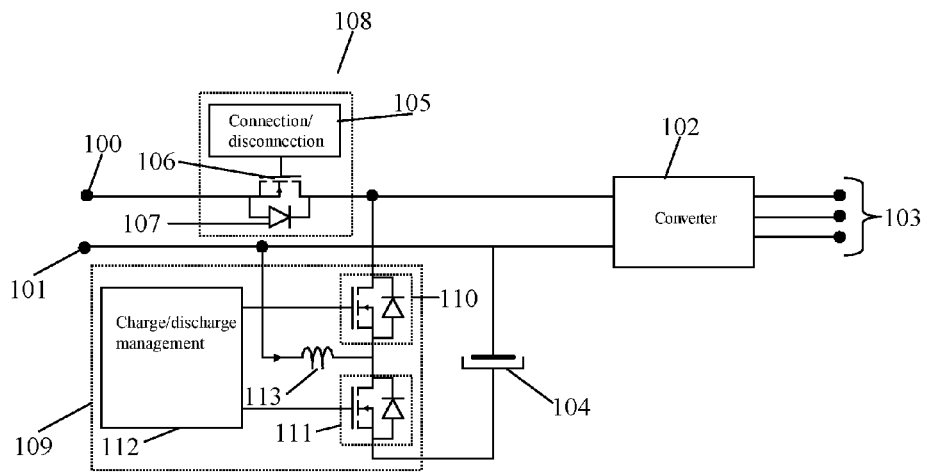
FIG. 1 illustrates a switched-mode power supply circuit diagram according to the state of the art.

Input terminals 200, 201 receive a DC input voltage to convert from a DC electrical network (or from a rectified AC network). A conversion module 202 (which may comprise a plurality of converters) regulates that input DC voltage and provides regulated output voltages on the output terminals 203. In order to protect the switched-mode power supply, an energy store 204 is connected to the terminals of the conversion module.

A control circuit 205 (for example a NOT gate) controls a switch 206 (for example a MOSFET transistor) connected in parallel with a diode 207. All the components 205, 206 and 207 form part of a module 208 for connecting and disconnecting the supply of the electrical network providing the DC voltage input.

The storage module is charged and discharged by a charging and discharging module 209.

This module 209 comprises two switching modules 210, 211. For example, each switching module comprises a switch (for example a MOSFET transistor) connected in parallel with a diode. The switches are controlled by a charging and discharging management module 212. The control of the switching modules is simplified by them being referenced to the input terminal of which the voltage is taken as the ground of the device (or "cold point"), for example here the terminal 201. For example, the source of a MOSFET transistor or the emitter of an IGBT transistor capable of being used as a switch, is connected to that cold point.

The charging and discharging module further comprises a transformer 213 with a primary winding 214 and a secondary winding 215.

The primary winding 214 is connected in series with the switching module 210 between the input terminals 200 and 201, so forming a primary circuit. For example, the switching module is connected to the input terminal of which the voltage is taken as the ground of the device (or "cold point"), for example here the terminal 201.

The secondary winding is connected in series with the switching module 211 and the energy store module 204, thus forming a secondary circuit. The secondary circuit is for example closed. It is for example closed on the input terminal of which the voltage is taken as the ground of the device (or "cold point"), for example here the terminal 201. For example, the secondary winding is connected between the switching module 211 and the storage module 204.

Figure 2:
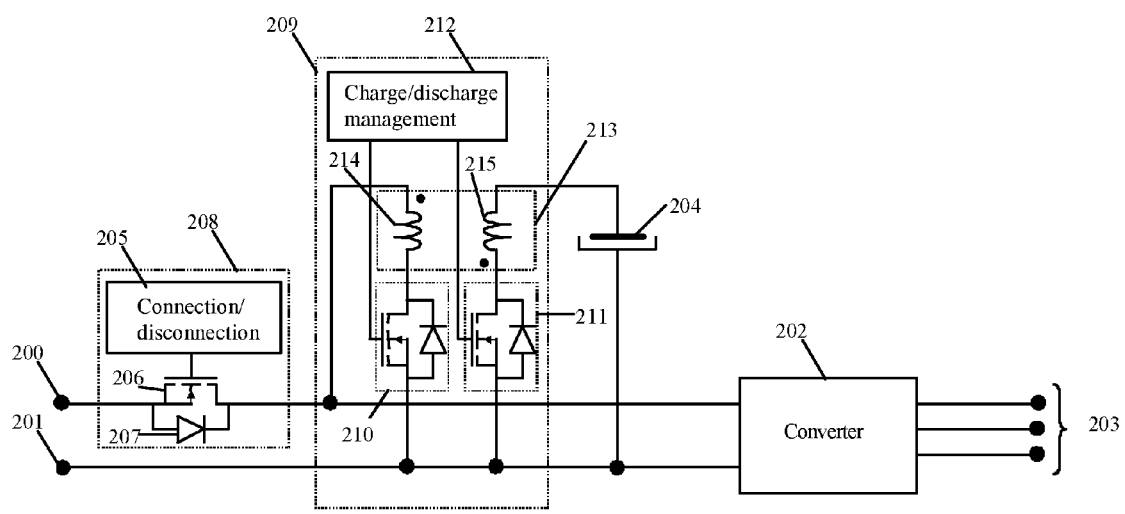
FIG. 2 illustrates a switched-mode power supply circuit diagram according to some aspects of the present subject matter.

The circuit of FIG. 2 relies on an isolated inverter topology, of "flyback" type.

The primary and secondary windings are integrated into circuits connected together (by the cold point). Thus, the parasitic capacitive currents, due to the parasitic capacitance between windings are fed back in a connection path which is as short as possible (they pass into the connection between the two windings, without extending into the remainder of the circuit or even beyond that circuit), and only generate a little electromagnetic disturbance. It is thus possible to have a relatively high parasitic capacitance, and thus to pair-wind two wires in order to limit leakage inductances.

The charging voltage of the energy store may be chosen on the basis of the transformation ratio of the transformer. However, other parameters may be used, for example such as the technology of the capacitance, the storage density, the safety of persons, the switch technology, or other parameter. The "flyback" topology makes it possible to have different ratios of input voltage to output voltage, regardless of the transformation ratio.

According to a first approach, the transformation ratio may be equal to one, that is to say that the two windings of the transformer have the same number of turns. Such a transformation ratio makes it possible to facilitate the production of the inductor and to improve the characteristics thereof, in particular to minimize leakage inductance. The choice of a transformation ratio equal to one does not very strongly constrain the charging voltage of the energy store module. However, as the transformation ratio is fixed, according to the voltage ratio between the network voltage and the charging voltage of the energy module, the circuit may be caused to operate with duty cycles close to 0 or close to 1.

According to a second approach, the transformation ratio may be chosen so as to optimize the circuit duty cycle range to use given the charging voltage of the energy store module chosen. The yield of the charging and discharging module may thus be optimized.

A switched-mode power supply according to the diagram of FIG. 2 may be implemented in accordance with several variants. In particular, the position of the connection and disconnection module on one or other of the input terminals, the arrangement of the primary circuit, the arrangement of the secondary circuit, and the referencing of the secondary circuit, provide degrees of freedom of implementation.

Other degrees of freedom are linked to the galvanic insolation between the primary and secondary windings.

The device according to the disclosure has a multitude of implementations which enable its employment in supply systems with various characteristics. Thus, the supply designer may adapt the device to the specific needs of his or her system. Examples of device variants are presented below with advantages. The advantages presented are not limited to a circuit. Certain advantages presented for one circuit may apply to others.

FIGS. 3a to 3f are simplified circuits of devices according to embodiments. In particular, the charging and discharging module is not represented.

Figure 3A:
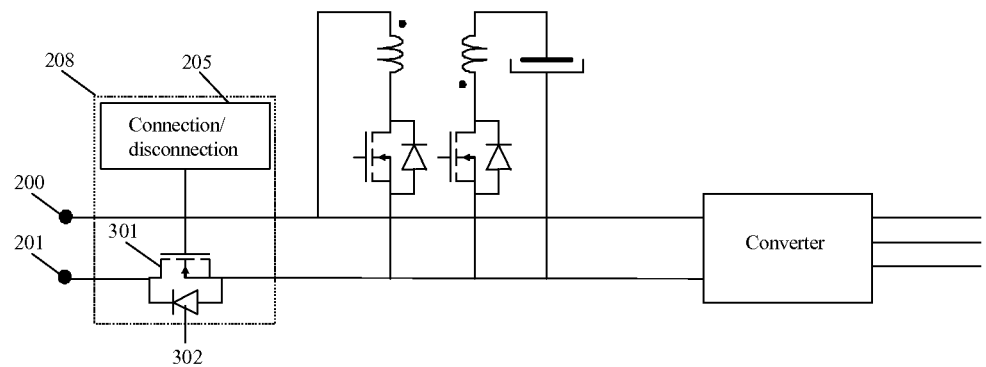
FIGS. 3a-3f illustrate simplified circuit diagrams of devices according to some aspects of the present subject matter.

In the circuit of FIG. 3a, the connection and disconnection module 208 is connected to terminal 201 of the device corresponding to the voltage taken as ground ("cold point" of the device).

Module 208 comprises a controlled switch 301 (for example a MOSFET transistor). The switch is controlled by the control circuit 205 connected in parallel with a diode. Relative to module 208 of FIG. 2, the transistor 301 and the diode 302 are connected in reverse to the transistor 206 and the diode 207.

When the switch comprises an N-channel MOSFET transistor and module 208 is connected to the cold point, the transistor may be controlled without having to generate a higher voltage than that of the hot point (voltage of terminal 200).

Figure 3B:
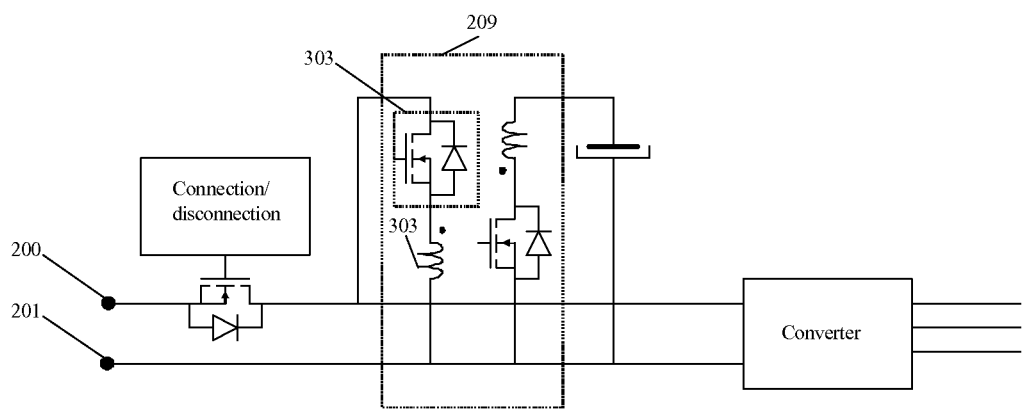

In the circuit of FIG. 3b, the charging and discharging module 209 comprises, in the primary circuit, a switching module 303 and a primary winding 304 of which the connection order is not the same as in FIG. 2. In the circuit of FIG. 3b, it is the primary winding that is connected to the cold point of the circuit.

In this configuration, the effect of the parasitic capacitances of the switching module switches is reduced. The drain (if is a MOSFET transistor) or the collector (if it is an IGBT transistor) of the switch is connected to a voltage not subjected to switched mode.

Furthermore, the referencing of the switching modules to different voltages (module 211 is referenced to the cold point and not module 303) makes it possible to cancel the effect of the parasitic currents in the transformer, in particular in a transformer with "two pair-wound wires" and in a transformer with a transformation ratio equal to one.

Figure 3C:
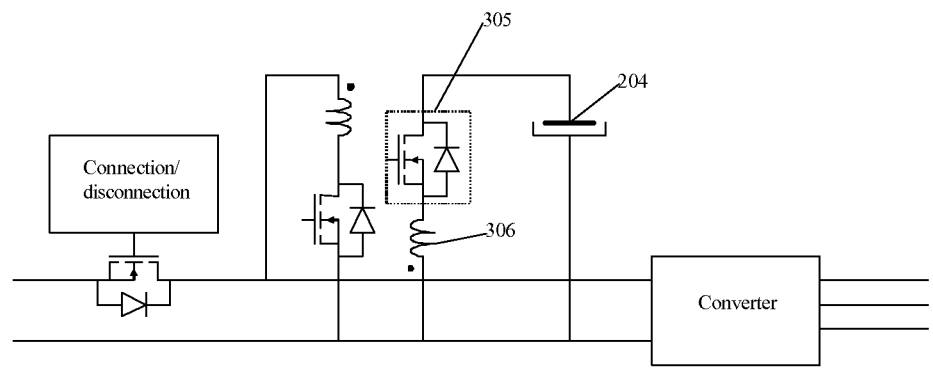

In the circuit of FIG. 3c, the charging and discharging module 209 comprises, in the secondary circuit, a switching module 305 and a secondary winding 306 of which the connection order is not the same as in FIG. 2. In the circuit of FIG. 3c, it is the switching module 305 that is connected between the secondary winding and the storage module 204.

The configuration of the circuit of FIG. 3c provides similar advantages to those of the circuit of FIG. 3b.

Figure 3D:
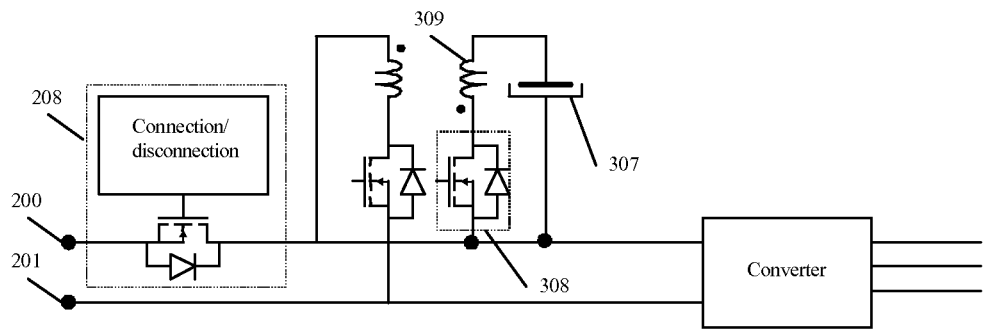

In the circuit of FIG. 3d, the secondary circuit is not closed on the voltage of the cold point of the circuit as is the case in the circuit of FIG. 2. The storage module 307 and the switching module 308 of the circuit of FIG. 3d are connected to the output of connection and disconnection module 208. The winding 309 of the secondary is connected in series between the two of them.

Figure 3E:
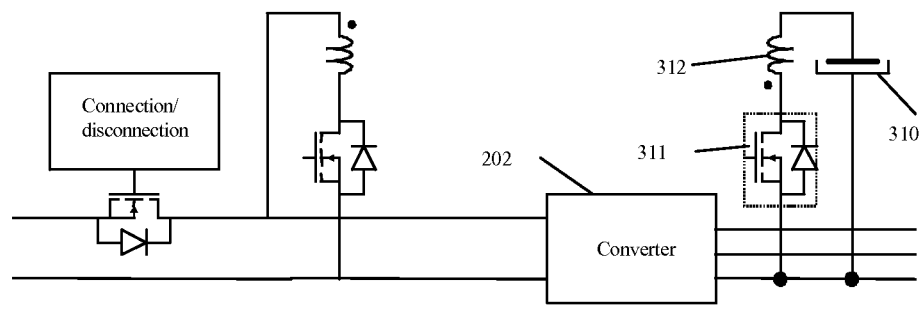

In the circuit of FIG. 3e, the secondary circuit is closed on an output terminal of the converter module 202. Thus, the storage module 310 and the switching module 311 are connected to that output terminal. The secondary winding 312 of the transformer is connected in series between the two of them.

Figure 3F:
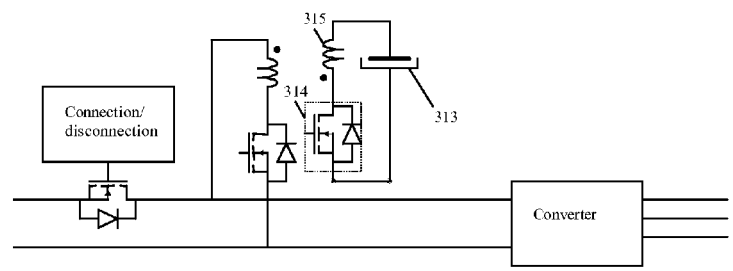

In the circuit of FIG. 3f, the secondary circuit, comprising, connected in series, the storage module 313, the switching module 314 and the secondary winding 315 of the transformer, is closed on itself, without being referenced to a voltage of the circuit. The secondary circuit is not connected to any point on the circuit.

The different variants described above offer various advantages. These advantages are not necessarily exclusive of each other, and may be combined in the same circuit.

In particular, in the variants in which a switch controlled at its source (for a MOSFET) or its emitter (for an IGBT) connected to the voltage to which the circuit control is referenced, that switch is simpler to control.

When the drain (for a MOSFET) or the collector (for an IGBT) of a controlled switch is connected to a voltage not subjected to switch mode (as is the case in the circuits of FIGS. 3b and 3c), it is possible to reduce the parasitic currents linked to the parasitic capacitances usually present between the drain or the collector and the surroundings. To be precise, the substrate of the chip constituting the switch is usually the drain or the collector thereof.

When the corresponding ends of the two winding are both connected to a potential not subjected to switched mode (as is the case in the circuits of FIGS. 3b and 3c), the temporal variation dv/dt of the voltage between corresponding turns of the two winding may be cancelled. Thus, a winding with "two pair-wound wires" may be used while having very low capacitive currents. The winding with "two pair-wound wires" makes it possible to minimize the leakage inductance and thus to optimize operation, at the expense of an increase in the parasitic capacitances between the primary and secondary, which usually results in an increase in the parasitic capacitive currents.

Apart from the variant of FIG. 3e, when the converters of the conversion module have galvanic isolation, the parasitic capacitive currents may be fed back by wired pathways internal to the device. Thus, low levels of electromagnetic disturbance are generated outside the assembly.

After having presented architectures of the circuit according to the embodiments, the following portion of the description details the regulation of these circuits.

Generally, to measure the current in the device, it is possible to use a shunt resistor and/or a current transformer.

Figure 4A:
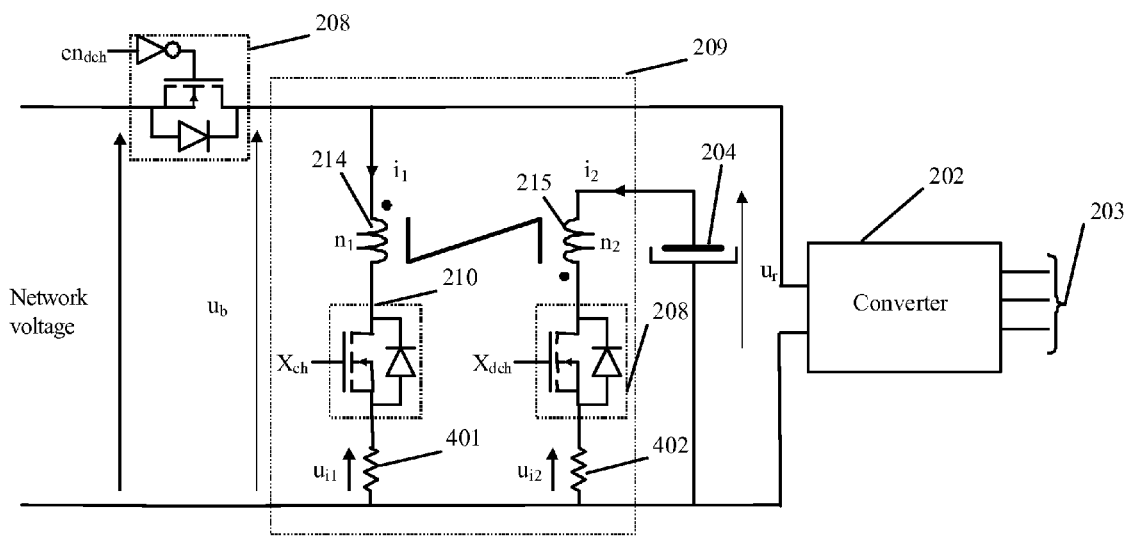
FIG. 4a illustrates a switched-mode power supply circuit diagram that is capable of taking measurements of current by shunt resistors referenced to the ground according to some aspects of the present subject matter.

In particular, it is possible to only take measurements of current by shunt resistors referenced to ground, as illustrated by the circuit of FIG. 4a.

Another advantage is that these shunt resistors deliver voltages that are always positive. This makes it possible to dispense with the need for a negative supply and makes it possible to envision implementations in which only one current comparator is used.

FIG. 4a includes the circuit of FIG. 2 with the same reference signs. Two shunt resistors 401 and 402 have been added, connected between the cold point of the circuit and, respectively, the switching modules 210 and 208. The switching modules 210 and 208 are respectively controlled by signals) $X_{ch}$, $X_{dch}$ for charging and for discharging the energy store module.

Figure 4B:
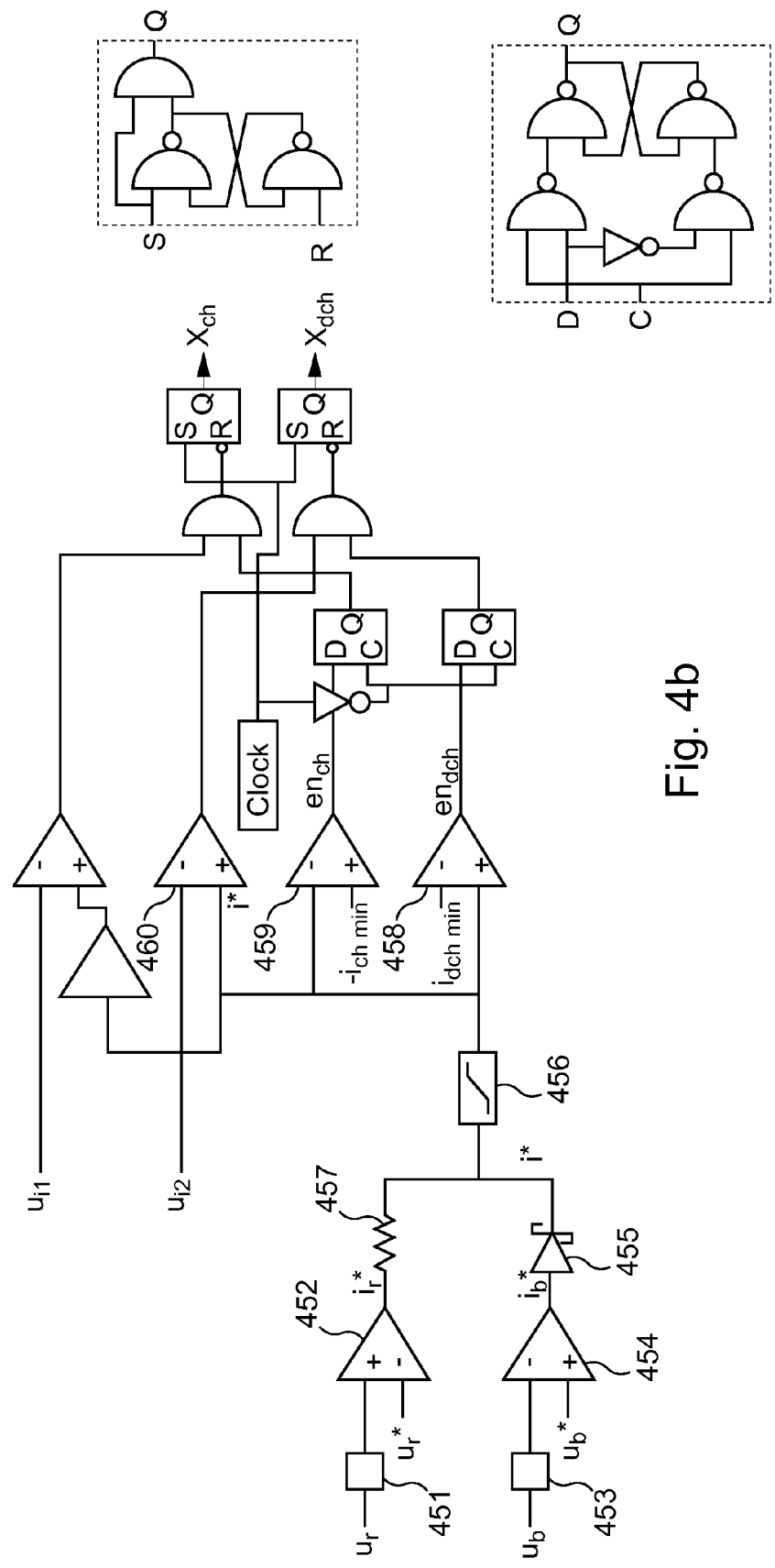
FIG. 4b illustrates a control circuit diagram for generating signals according to some aspects of the present subject matter.

The circuit control strategy is described below, with reference to FIG. 4b which represents a control circuit for generating the signals $X_{ch}$ and $X_{dch}$ for controlling the switching modules 210 and 208.

The voltage $u_r^*$ represents the control signal for the store voltage $u_r$ at the terminals of the energy store module 204. The voltage $u_b^*$ represents the control signal for the bus voltage $u_b$ at the terminals of the conversion module and of the charging and discharging module 209.

The voltage $u_r$ is supplied to a shaping module 451 of which the output is compared to the voltage $u_r^*$ by a comparator 452. Similarly, the voltage $u_b$ is supplied to a shaping module 453 of which the output is compared to the voltage $u_b^*$ by a comparator 454. The comparators apply respective gains to the comparison of their input signals.

The store voltage control signal $u_r^*$ is chosen so as to protect the energy store module (comprising for example a capacitor), and to store sufficient energy therein. The bus voltage control signal $u_b^*$ is chosen at the limit value (of network voltage) above which the energy of the network is used, and below which the energy of the store is used.

The operation of the charging and discharging module is governed by a single control value i*, which is the control signal for current in the winding 214 of the primary circuit, the latter being defined by:

$$i = i_2 - (n_1/n_2) \times i_1$$

$n_1$ and $n_2$ being the number of respective turns of the two windings, primary 214 and secondary 215, of the transformer.

The control signal for current is saturated positively at the value $i_{max}^*$ and negatively at the value $i_{min}^*$.

The current $i_b^*$, supplied at the output of the comparator 454 represents the control signal for current established in order to regulate the bus voltage. The current $i_r^*$, supplied at the output of the comparator 452 represents the control signal for current established in order to regulate the store voltage.

The output of the comparator 454 is supplied to a Schottky diode 455. The control signal for current i*, at the output of the Schottky diode 455, is equal to that one of the two control signals $i_b^*$ and $i_r^*$ which is algebraically the greatest (that is to say which has the greatest capability for a transfer of energy from the energy store module to the conversion module).

To be precise, if the store voltage is greater than the control signal ($i_r^* > 0$) and the bus voltage also ($i_b^* 0$), it is necessary to discharge the store (i*>0), and not the bus. Similarly, if the store voltage is less than the control signal ($i_r^* < 0$) and the bus voltage also ($i_b^* > 0$), it is necessary to discharge the store (i*>0), and not the bus.

The output from the comparator 452 is connected to a current limitation module 456, via a resistor 457. The output from the comparator 455 is also connected, via the Schottky diode 455, to the current limitation module.

The association between the resistor 457 and the diode 455 enables arbitration between the control signals for current.

Depending on the amplitude and the sign of the current i*, the current limitation module enables the charging or discharging of the energy store module. The output from module 456 is provided as input to three comparators 458, 459, 460 and 461. The output from module 456 is supplied to comparator 461 via a gain module 462 of which the gain value depends on transformation ratio of the transformer: $-(n_1/n_2)$.

The comparators 459 and 458 make it possible to avoid inadvertently commanding the charging and discharging of the energy storage module. They furthermore make it possible to avoid simultaneously commanding charging and discharging.

Thus, the comparator 458 compares the output from module 456 with a minimum discharge current value $i_{dch}$ to provide a signal $en_{dch}$ as output. The comparator 459 compares the output from module 456 with a minimum charge current value $i_{ch}$ to provide a signal $en_{ch}$ as output. Thus, the charging and discharging of the energy storage module are only commanded when the signal output from module 456 is significant enough.

The signals $en_{dch}$ and $en_{ch}$ are provided to a synchronization logic to synchronize the orders for charging and discharging the energy storage module with a clock signal.

The signal $en_{dch}$ is provided as input to the input D of a first D latch 463. The signal $en_{ch}$ is provided as input to the input D of another D latch 464. The respective inputs C of the latches 463 and 464 receive a clock signal from a clock 465 which is inverted by an inverting gate 466. The output Q from latch 463 is supplied as input to a NAND gate 467 and the output Q from the latch 464 is provided as input to a NAND gate 468. The D latches 463 and 464 are conventional. A detail of their wiring is represented in window 469.

Control of the switching modules 208 and 210 depends in particular on the control signals $u_r$ and $u_b$, and on the measurements of current in the shunt resistors 401 and 402.

Thus, the comparator 460 compares the output from the current limitation module 456 with the voltage $u_{i2}$ representing the current passing through the shunt resistor 402 while the comparator 461 compares that output, amplified by the gain $(-(n_1/n_2))$ of the gain module 462, with the voltage $u_{i1}$ representing the current passing through the shunt resistor 401. The output from the comparator 461 is supplied as input to the NAND gate 468 and the output from the comparator 460 is provided as input to the NAND gate 467.

The charging $X_{ch}$ and discharging $X_{dch}$ control signals are supplied by SR flip-flops 469 and 470.

The SR flip-flop 469, which delivers the signal $X_{ch}$ at its output Q, receives, on its R input (reset) the inverted output from the NAND gate 468. It furthermore receives on its S input (set) the clock signal from clock 465. The SR flip-flop 470, which delivers the signal $X_{dch}$ at its output Q, receives, on its R input (reset) the inverted output from the NAND gate 467. It furthermore receives on its S input (set) the clock signal from clock 465. The SR flip-flops 469 and 470 are conventional. A detail of their wiring is represented in window 471.

The control arrangement with the SR flip-flops makes it possible to control the switching modules 208 and 210 in Peak Current Mode.

Thus, in a regulation mode, it is the bus voltage which is regulated and in another regulation mode, it is the store voltage which is regulated. The passage from one regulation mode to the other is directly determined by the control signal values $i_b^*$ and $i_r^*$.

There is an operating point common to both regulation modes when $i_b^* = i_r^*$.

The passage from one regulation mode to the other is not strictly equivalent to the change in sign of the control signal for current i*.

This strategy has several advantages.

The construction of the control signal i* as choice of the largest of the two control signals $i_b^*$ and $i_r^*$ ensures that the passage from one mode to the other (from $i^*=i_b^*$ to $i^*=i_r^*$ and vice-versa) does not introduce any discontinuity into i*, and therefore no disturbance of the system.

This furthermore enables an operation without oscillation at the intersection between the two modes. In particular, when the network is of high impedance and/or the charging current very great, if the current absorbed on the network to charge the store module with energy makes the network voltage drop to the neighborhood of $u_b^*$, the bus voltage regulation enters into play even though the energy store module is still in course of charging (with a reduced current), so avoiding a more significant collapse of the network or possible oscillations. This property makes it possible to adjust the store charging current (via $i_{min}^*$) so as to obtain a very fast charge when the network is of low impedance, without this posing any problem when the network is of very high impedance.

The existence of two separate voltage loops enables different regulation according to needs. To be precise, the presence of capacitors with different values on the two voltages to regulate may require different gains.

Of course, the present disclosure is not limited to the described embodiments, other variants and combinations of features are possible. The various components described may be substituted by one or more other components configured to fulfill the functions described for each component of the circuits described above.

The invention claimed is:

1. A switched-mode electrical power supply device for regulating a DC input voltage provided between two input terminals of the switched-mode electrical power supply device by an electrical network, the switched-mode electrical power supply device comprising:
    at least one conversion module to convert the DC input voltage into a regulated DC voltage,
    an energy store module to store electrical energy to yield to the at least one conversion module in case of outage of the DC input voltage,
    a disconnection module for disconnecting the switched-mode electrical power supply device from the electrical network in case of outage of the DC input voltage,
    a management module distinct from the disconnection module, wherein the management module is directly connected to first and second switching modules and configured to manage charging and discharging of the energy store module by controlling the first and second switching modules, and
    an electrical transformer, and wherein:
    a primary circuit connected between the two input terminals comprises a primary winding of the electrical transformer connected in series with the first switching module controlled by the management module,
    a closed secondary circuit comprises a secondary winding of the electrical transformer connected in series with the energy store module and the second switching module controlled by the management module, and
    the closed secondary circuit is closed because an input end of the closed secondary circuit and an output end of the closed secondary circuit are directly coupled to a common electrical node, and wherein the input end is electrically coupled to the secondary winding of the electrical transformer and the output end is electrically coupled to the energy store module.

2. The switched-mode electrical power supply device according to claim 1, wherein the closed secondary circuit is closed on one of the two input terminals.

3. The switched-mode electrical power supply device according to claim 1, wherein the disconnection module comprises a control circuit configured to control a disconnection switch connected in parallel with a diode.

4. The switched-mode electrical power supply device according to claim 3, wherein the disconnection module is connected to one of the two input terminals different to another one of the two input terminals where the secondary winding is closed.

5. The switched-mode electrical power supply device according to claim 3, wherein the disconnection module is connected to a cold point of the switched-mode electrical power supply device.

6. The switched-mode electrical power supply device according to claim 1, wherein the closed secondary circuit is closed on an output terminal of the conversion module supplying the regulated DC voltage.

7. The switched-mode electrical power supply device according to claim 1, wherein at least one of the first and second switching modules has a connection terminal connected to a cold point of the switched-mode electrical power supply device.

8. The switched-mode electrical power supply device according to claim 1, wherein at least one of the first and second switching modules has a connection terminal connected to a hot point of the switched-mode electrical power supply device.

9. The switched-mode electrical power supply device according to claim 1, wherein corresponding ends of the primary and secondary windings are connected to a voltage that is not subjected to switched mode.

10. The switched-mode electrical power supply device according to claim 1, wherein each of the first and second switching modules comprises a transistor connected in parallel with a diode.

11. The switched-mode electrical power supply device according to claim 1, wherein each of the first and second switching modules is referenced to a cold point of the switched-mode electrical power supply device.

* * * * *